United States Patent [19]
Yall et al.

[11] 3,774,763
[45] Nov. 27, 1973

[54] WATER PURIFICATION SYSTEM

[75] Inventors: Charles E. Yall; Blair O. Bennett, both of Deerfield; Lawrence Russell Hogan, Lake Villa, all of Ill.

[73] Assignee: Culligan International Company, Northbrook, Ill.

[22] Filed: Oct. 15, 1970

[21] Appl. No.: 80,927

[52] U.S. Cl.............. 210/96, 210/110, 210/196, 210/258, 210/259, 210/321, 210/433
[51] Int. Cl............................................ B01d 31/00
[58] Field of Search...................... 210/23, 24, 110, 210/196, 254, 258, 259, 321, 433, 96

[56] References Cited
UNITED STATES PATENTS

| | | | |
|---|---|---|---|
| 3,616,921 | 11/1971 | Bray | 210/321 X |
| 3,670,892 | 6/1972 | Baerg et al. | 210/321 X |
| 3,276,458 | 10/1966 | Iversen et al. | 210/258 X |
| 3,493,496 | 2/1970 | Bray et al. | 210/254 X |
| 3,505,216 | 4/1970 | Kryzer | 210/321 X |
| 3,526,320 | 9/1970 | Kryzer | 210/254 |
| 3,542,199 | 11/1970 | Bray | 210/321 X |

OTHER PUBLICATIONS

Gouveia, et al., "Potable Water from Hospital Wastes by Reverse Osmosis", from Chemical Engineering Progress Symposium Series, Vol. 64, No. 90, 1968. pages 280-284

Polymetrics Reverse Osmosis, A Publication of Polymetrics, Inc.

Reverse Osmosis Systems, A Publication of Osmonics, Inc.

McDonald, Jr., "An Automatic Peritoneal Dialysis Machine for Hospital or Home Peritoneal Dialysis: Preliminary Report," from Trans. Amer. Soc. Artif. Inst. Organs, Vol. XV, published June, 1969. pages 108-111

Primary Examiner—Frank A. Spear, Jr.
Attorney—Hill, Sherman, Meroni, Gross & Simpson

[57] ABSTRACT

A high quality water purification system for providing water for use under near aseptic conditions such as in hemodialysis including an arrangement whereby water is purified by passing it respectively through a reverse osmosis bank, a deionizer, and at least one submicron filter in series, with means for insuring a constant flow of waste water to a drain from the outlet side of the reverse osmosis bank and means for by-passing water around the deionizer unit.

6 Claims, 2 Drawing Figures

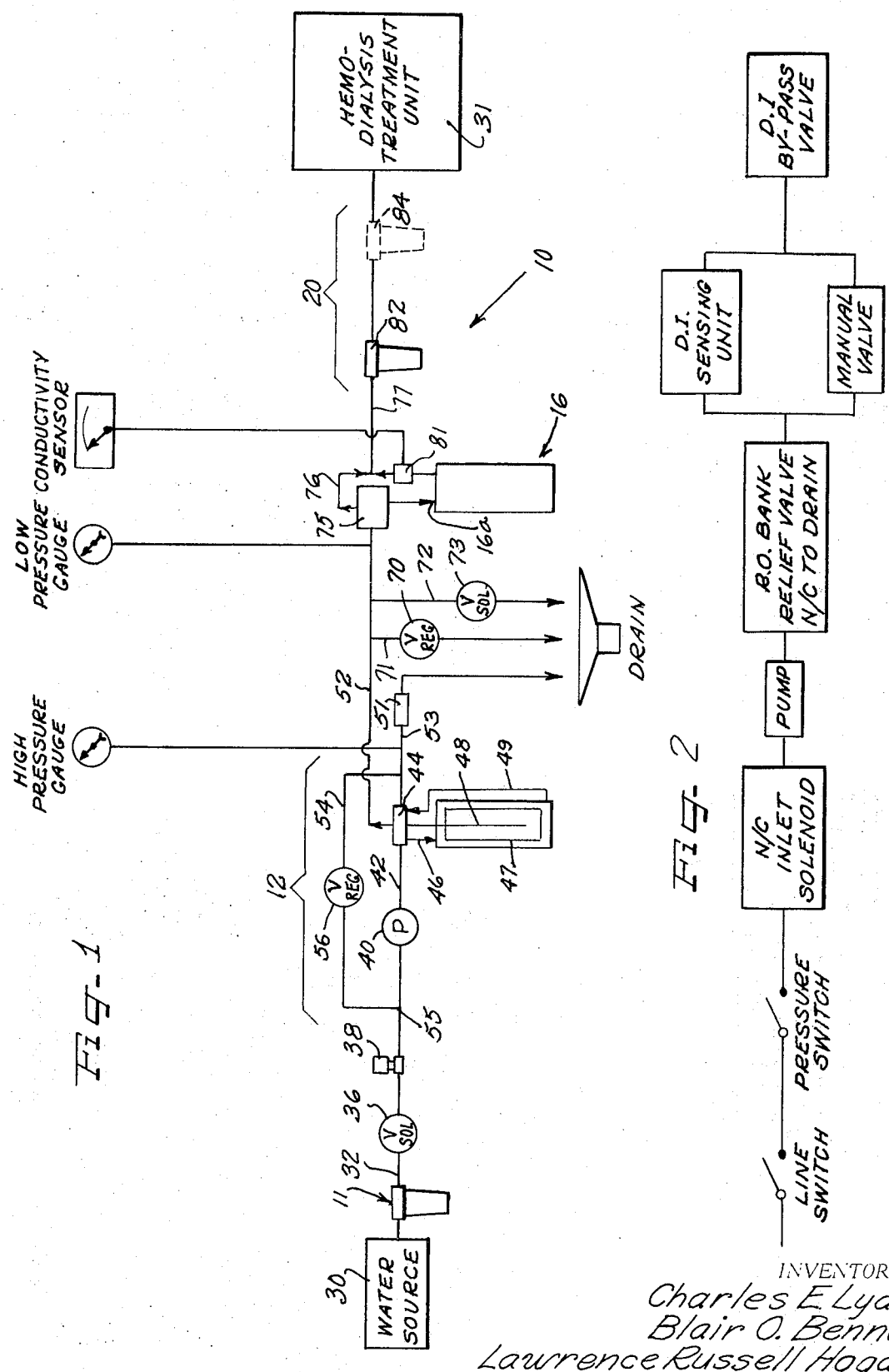

WATER PURIFICATION SYSTEM

BACKGROUND OF THE INVENTION

1. Field of the Invention

This present invention relates to a means and method for effecting liquid purification and more particularly concerns an efficient automatic water purification system consisting essentially of the three processes of reverse osmosis, deionization and submicron filtration (in series) which will yield water of that extremely high quality necessary to match the aseptic conditions required for hemodialysis.

2. Description of the Prior Art

Reverse osmosis may be characterized as the process of diffusion of solution through a semi-permeable membrane from a concentrated solution to a relatively more dilute fluid (dilute water or air for instance) occasioned by placing the concentrated solution under a pressure greater than the osmotic pressure of the concentrate. Water purification systems utilizing the reverse osmosis process are disclosed in the Westmoreland, Bray, and Rak U.S. Pat. Nos. 3,367,504; 3,367,505; and 3,456,803, respectively.

In order to insure diffusion of solvent through the semipermeable membrane, the influent water must be maintained under a pressure which is substantially higher than its own osmotic pressure. In order to maintain the desired system pressure for the raw or influent water, some valve means has been provided for controlling the flow of waste water from the reverse osmosis unit to drain.

The use of deionizers in water purification is well understood in the art and need not here be further described. Suffice it to say that the reactive resins in deionization units must be regenerated or replaced at intervals during their use and that the length of such intervals is directly related to the extent of impurities carried in the deionizer-influent water and to the volume of such water passed through the unit.

SUMMARY OF THE INVENTION

The present invention resides in the means and method whereby water may be purified by passing it respectively through a reverse osmosis bank, a deionizer, and at least one submicron filter, in series, and to a means for insuring an adequate pressure and water flow in the reverse osmosis bnak and controlling the flow of water to and through the deionizer unit.

In order to create the proper scrubbing action across the semi-permeable membrane used in the reverse osmosis process it is important that there be a high velocity flow of influent water under pressure over the membrane.

More specifically, the system is designed with a flow control means disposed in the waste water line leading from the reverse osmosis bank to drain to create a back pressure in that line. A second line leads from the waste water line (upstream of the flow control) to a pressure regulator valve and then back to the upstream side of the pump.

Heretofore back pressure on the reverse osmosis bank has generally been generated by placing a pressure relief valve in the waste water line leading to drain and has been so designed that water in that line could be exhausted to drain when and only when the pressures in that line exceeded the pressure setting of the relief valve. In such prior types of devices a reduction of pump pressure for any reason below the relief setting of the relief valve would result in a situation wherein no waste water would be exhaused to drain.

In the system constructed in accordance with the principles of the present invention, the back pressure regulator is disposed in the reverse osmosis bypass line and the waste outlet of the reverse osmosis assembly is always open to drain through the flow control member. Hence, even though the pump pressure drops to a point below the "relief setting" of the pressure relief valve, waste water will still be exhausted to drain.

In addition, the system is designed with a bypass line around the deionizer unit and with a bypass valve controlling water flow either through the bypass or to and through the deionizer unit. The bypass valve is electrically energizable and is wired in parallel with the pump and with a normally closed solenoid valve in the pump feed line and with a drain valve intermediate the reverse osmosis bank and the deionizer unit which valve is normally open to drain. Consequently, energization of the pump opens the pump feed line valve, closes the drain valve, and tends to place the deionizer bypass valve in a position to direct water to and through the deionizer unit. Switch means are provided, however, to override such automatic operation of the deionizer bypass valve during start-up so that the deionizer unit will not be exposed to unnecessary use and, in addition, automatic sense means are provided to shift the bypass valve into bypass position when the quality of the water has deteriorated below a predetermined level as determined by an electrical sensing unit.

Accordingly, it is an object of this invention to provide an efficient, economical, automatic system of producing a continuous supply of extremely well purified water for use, for instance, in a hemodialysis unit.

Another and more specific object of the invention resides in the provision of fluid flow control means disposed within the waste water outlet which opens to drain and a back pressure bypass line connected from the waste water line intermediate the flow control member and the reverse osmosis manifold to the suction side of the pump, with a back pressure regulator fitted within the bypass line.

Yet another feature of the invention involves a bypass arrangement around the deionizer assembly itself with means for automatically directing product water from the reverse osmosis assembly through the bypass line when the water passed through the deionizer has deteriorated to a predetermined critical level and to the means for manually effecting flow of water through the bypass around the deionizer as desired such as during start-up of the water treatment unit.

An important feature of the invention relates to means for opening to drain the reverse osmosis product water line leading to the deionizer and to means for closing the source water valve to the upstream side of the pressure pump upon shutdown of the water purification assembly.

BRIEF DESCRIPTION OF THE DRAWINGS

These and other objects, features and advantages of the present invention will become apparent from time to time as the following specification proceeds and with reference to the accompanying drawing, wherein:

FIG. 1 is a schematic flow diagram of a water purification system designed in accordance with the principles of the present invention; and FIG. 2 is a simplified circuit arrangement showing one means in which the various electrical components of the system of FIG. 1 may be related to one another so as to operate in accordance with the principles of this invention.

DESCRIPTION OF A PREFERRED EMBODIMENT

Referring initially to FIG. 1, there is shown a fluid treatment water purification system generally indicated at 10 for automatically producing a continuous supply of fluid such as water which has been purified to an extremely fine level. Product water from such a system may be considered to be practically bacteria free and to have an extremely low level of dissolved salts and is usable for instance for medical purposes under the extremely aseptic conditions required for hemodialysis. The fluid treatment or water purification system 10 in the preferred embodiment includes a 25 micron prefilter 11, a reverse osmosis assembly 12, a reverse osmosis instrumentation package (not shown which may include "pump on" and "line pressure" indicator lights,) a deionizer assembly 16, a deionizer instrumentation package including a "conductivity meter" and a "low pressure gauge" and a submicron filter assembly 20 including 0.25 and 0.12 submicron filters plumbed in series. Water from a source 30 is passed through and processed by the water purification means and the purified product water finally passes through the submicron filter assembly 20 to a point of utilization which for illustrative purposes is here shown as a hemodialysis treatment unit 31. The waste water resulting from the purification process is passed to drain (so indicated).

The system is supplied with feed water from the source 30 and as previously indicated, such feed water passes first through the 25 micron prefilter 11 to filter out the larger water-borne particles. The outlet side of this first preflter is connected through the line 32 with the inlet side of a normally closed solenoid actuated shut-off valve 36 and thence through a low water pressure detector and switch 38 to the upstream or suction side of a positive displacement pump 40.

It should be understood that water from the source 30 may vary considerably in different localities depending upon the source of such water and it should be understood that other pre-conditioning means, not shown, may be added to the system. The feed water may be entirely wholesome for drinking purposes and still contain dissolved and/or undissolved solids as well as bacteria which must be practically entirely removed from the water before such water can be used in various medical processes such as in a hemodialysis treatment unit employed to replace the functions of the human kidney. The combination of elements of this invention provide an economical, efficient and reliable means for removing these impurities from the water.

The positive displacement pump 40 is selected to discharge water under a pressure of approximately 200 psi and that water is directed through the pipe 42 to the manifold 44 of the reverse osmosis assembly. Suffice it to say at this juncture that the normally closed solenoid valve 36 is wired in series with the pump 40 so that energization of the pump will at the same time open the valve and permit the free flow of water from the submicron prefilter to the pump.

As previously mentioned, reverse osmosis will take place where pressure is applied to a concentrated solution adjacent a semi-permeable membrane to cause a flow through the membrane into an area of relatively more dilute solution. An example of such operation is set out in U. S. Pat. No. 3,456,803. The semipermeable membrane in the reverse osmosis unit acts as a barrier to certain molecules in the feed solution and does not allow them to pass therethrough into the dilute solution. When applied to water in the present illustration, the concentrated solution such as a mineralized water is purified by passage of water molecules through the membrane by diffusion, thus rejecting the solute and other impurities in the water.

The purified water passing through the membrane and that which carries the rejected solutes is referred to as "waste" water. From a practical standpoint, semipermeable membranes used in this process are not 100 per cent efficient and thus some extremely small quantities of salts may pass through the membrane. As a rule of thumb the membrane in the reverse osmosis unit can be expected to reject 90 to 95 per cent of the salts in the feed water.

In the illustrated system, the manifold 44 directs water to the reverse osmosis assembly and then directs product water flowing from that assembly to a product water line 52 and waste water resulting from the reverse osmosis process to and through the waste water line 53 to drain. Influent water to the reverse osmosis assembly passes from the manifold 44 through fitting 46 to the interior of the reverse osmosis assembly. It then passes around a semi-permeable membrane 47 within the RO (reverse osmosis) unit.

The semi-permeable membrane of the reverse osmosis assembly may be made of any known suitable material having sufficient strength to accept the approximately 160–170 psi pressure differential which occurs with an inlet water pressure of about 200 psi, a product water pressure of 30 psi, and a head loss approximating 10 psi.

Since the pressure of water passing through the fitting 46 is higher than the osmotic pressure of the influent water, water passes through the semi-permeable membrane 47 into the collector end portion of a tube 48 and thence back to the manifold 44. The water passing up through tube 48 is referred to as "product water" inasmuch as it comprises a solute-free water capable of passing through the semi-permeable membrane 47. There is a continuous flow of water through the fitting 46 during operation of the device and such water as does not pass through the semi-permeable membrane 47 including the solutes which cannot pass through the membrane, pass through the waste water fitting 49 back to the manifold 44. Waste water is then directed from the manifold 44 through the waste water line 53 to the drain.

A constant rate of flow control device 51 is fitted within the waste water line 53 and ideally comprises a resilient annular flow control which is effective to reduce the effective flow area through the device upon increases in upstream pressures in order to maintain a constant rate of fluid delivery to the drain. It is possible that the flow rate device 51 might comprise a manually variable restrictor also. At any rate, the constant rate of flow device 51 is always open to drain to permit some flow of water through the waste water line irrespective of upstream pressure variations.

A bypass back pressure line 54 communicates the waste water line 53 intermediate the manifold 44 and the constant rate of flow device 51 with the upstream side of the pump 40 at the point 55. Junction 55 is disposed intermediate the low pressure switch and the pump. A back pressure regulator 56 which is preferably of the variable type and manually adjustable to a predetermined back pressure setting is disposed in the back pressure bypass line 54. When water pressure in waste water line 53 begins to exceed the relief setting of the regulator, water will be exhausted through it to the upstream side of the pump until the desired back pressure in line 53 in attained again.

In the operation of the reverse osmosis unit, it is desirable to maintain a high volume and high velocity flow of water across the semi-permeable membrane 47 in order to insure that solutes which cannot pass through the membrane will be scrubbed off the membrane and will not compact thereon to reduce its efficiency. The combination of the constant rate of flow device 51 in the waste water line and the pressure regulator bypass line 54 insures this scrubbing action. In the illustrated embodiment of the invention the back pressure regulator is set at approximately 190 psi and the pump pressure is approximately 200 psi. There is some reduction in pressure caused by passage of water to and through the product line and through the constant rate of flow control device 51 but at all times a flow of waste water passes through the flow control device 51 to drain. In order to insure the passage of a high volume of water across the semi-permeable membrane and to conserve the water used by the system, water passes back through the bypass line 54 and through the back pressure regulator to the upstream side of the pump where it again passes through the reverse osmosis assembly and is recycled.

Since it is essential that the pressure of influent water in the line 46 be greater than the osmotic pressure of that influent water, the low pressure switch 38 is interposed in the source water line and will shut the entire system down if there is a shortage of water, for instance, which would result in a pressure drop. This might occur for instance if the prefilter 11 became clogged. Thus, pump damage is prevented and reverse flow through the reverse osmosis assembly is likewise prevented.

Turning now to the portion of the system wherein the ionization of the water is effected, water flows through the product line 52 from the reverse osmosis assembly and the manifold 44 to the upstream side 16a of the deionizer assembly 16. The deionization unit is of a type which is well known in the art and which will not herein be further described except to say that in the preferred embodiment of the invention a mixed bed deionizer is employed having disposable resins so that regeneration of used resins need not be undertaken. Resin replacement is simply effected by removing a cartridge or bag of spent resin and replacing it with a bag of new resin. The system thus designed is particularly advantageous in that maximum sanitation and bacterial control is assured at all times. The particular deionizer employed in the preferred embodiment of the invention operates under a designed inlet pressure of about 30 psi in order to insure an adequate volume of deionizer product water flow. In order to achieve this pressure, a back pressure regulator 70 is fitted within a back pressure line 71 which, in turn, is connected to the product line 52. In addition, an exhaust line 72 interconnects the product line 52 with a solenoid valve 73 which is normally open to drain and which when energized prevents water flow from the product line to drain. This valve is also wired in series with the solenoid valve 36, the low pressure switch 38, and the pump 40. If the system is shut down, the valve 73 opens draining water from the product line 52, the pump stops, and the solenoid shut-off valve 36 closes to prevent subjecting the pump to source water pressures.

A deionizer bypass valve 75 is fitted within the product line 52 on the upstream side of the deionizer unit and has one of its two outlers connected to the line leading to the deionizer inlet 16a and the other of its outlets is connected to deionizer bypass line 76. That line leads to the deionizer product outlet line 77 and then to and through a submicron filter assembly. In a water treatment system associated with a hemodialysis unit designed for home use, a single submicron filter (for instance, a 0.35 micron filter) is located at this point and is shown at 82. In other systems such as those designed for hospital use, a plurality of submicron filters may be employed and in such case the filter 82 may be a 0.25 micron filter followed downstream serially in line by a 0.12 micron filter. The submicron filter assembly insures purified bacteria-free water at the outlet of the water treatment system.

The deionizer bypass valve 75 is designed so that in one position, water will pass from the line 52 to and through the bypass line 76 and so that in a second adjusted position water will pass only from the line 52 to and through the deionizer itself.

Functionally, the deionizer bypass valve 75 performs as follows:

When the unit is running under normal operating conditions, the deionizer bypass valve 75 is in a position to pass water from the reverse osmosis assembly through the line 52 and thence through the deionizer to the line 77 and the two submicron filters. When a conductivity sensor 81 senses that water flowing from the deionizer has deteriorated to a point which would indicate that the deionizer resins are spent, a deionizer sensor relay will automatically shift the deionizer bypass valve to a position to cause water to flow from the line 52 to and through line 76 to the line 77 and water flow through the deionizer will cease.

In addition, means are provided for manually switching the bypass valve 75 to the bypass position in order to cause water to bypass the deionizer during start-up, for instance, and prior to the time that the hemodialysis treatment unit is actually placed into service in order to lengthen the useful life of the resins in the deionizer.

Signaling means are provided to signal the unit operator whenever the valve 75 is in the bypass position whether under automatic control or by manual switching so that it will not inadvertently be switched to or remain in that position without knowledge of the operator. The circuitry for operating the various solenoid operated valve, the pump, the conductivity sensor and the bypass shut-off valve is hereafter described.

Schematically and in simplified form, the various control components of the water purification system are connected in series with the line switch and the pump motor (so indicated). The low pressure switch is designed to open when the water pressure in the line on the suction side of the pump falls below a predetermined point and such switch opening will shut down operation of the entire system. The inlet solenoid shut-off valve is normally closed but opens to permit free flow of water to the suction side of the pump and closes communication between the water source and the pump upon opening of the line switch or the low pressure switch. The reverse osmosis bank relief solenoid 73 is normally open to drain so that during system operation this valve is energized and closed to drain.

The deionizer bypass valve 75 can be energized in one of two ways. It is energized electrically either by the operator of the apparatus through the manual switch control or automatically through the deionizer sensing relay. The operator may manually switch the valve to bypass position during start-up of the system and during those times when water is being passed through the assembly but is not yet actually being used in order to conserve the useful life of the deionizer resins. During normal operation of the system, the manual switch is placed in a position to place energization of the deionizer bypass valve 75 under the automatic control of the deionizer sensing relay and that relay functions as heretofore described to energize the deionizer bypass valve 75 when the conductivity of water passing from the product side of the deionizer unit has risen to a point to indicate that the active deionizer resins are no longer performing their function.

Means may be provided to advise the operator that the conductivity of the water passing from the outlet end of the deionizer indicates a predetermined water purification level and these means (an alarm for instance) will, of course, be energized through the conductivity sensor.

Obviously, other indicating elements can be incorporated in the circuit to indicate that the line switch is on, the low pressure switch is open or closed, or that the deionizer is being used. These have not been shown herein since the use of each of these is well understood in the art.

The placement of pressure gauges and a readable conductivity meter is shown in FIG. 1 and these elements also operate on known principles to provide a means for accurately monitoring the operation of the system. FIG. 2 simply shows a means of electrically connecting the various components of the system relative to one another and is obviously not meant to constitute a detailed circuit diagram which would be understood by those skilled in this art.

It will be understood that this embodiment of the invention has been used for illustrative purposes only and that other modifications and variations of the system herein disclosed may be made without departing from the spirit and scope of the concept of this invention.

We claim as our invention:

1. A water purification system comprising:
   a source of water;
   a pump having an upstream and a downstream side;
   an inlet line connected between said water source and said upstream side of said pump;
   a reverse osmosis unit connected to said downstream side of said pump for providing purified product water and waste water;
   a deionizer means for providing deionized product water;
   a purified product water line connected between said reverse osmosis unit and said deionizer means;
   a deionized product water line connected between said deionizer means and a point of utilization;
   a waste water line connected between said reverse osmosis unit and a drain;
   a fluid flow control means positioned within said waste water line at a point prior to said drain;
   a back pressure bypass line connected between said waste water line at a point prior to said fluid flow control means and said upstream side of said pump;
   a back pressure regulator means positioned within said back pressure bypass line for providing pressure relief from said waste water line when water pressure therein rises above a predetermined point;
   a deionizer bypass line connected between said purified product water line at a point prior to said deionizer means and said point of utilization;
   a diverter valve means positioned within said purified product water line at a point prior to said deionizer bypass line actuatable for selectively directing water from said purified product water line to said deionizer means or to said deionizer bypass line;
   normally closed valve means positioned within said inlet line prior to said upstream side of said pump;
   normally open valve means positioned within said purified product water line at a point prior to said diverter valve means; and
   an actuation means operationally connected to said normally closed and normally open valve means and to said pump for opening said normally closed valve means, closing said normally open valve means and activating said pump.

2. A water purification system in accordance with claim 1 wherein micron filter means are provided upstream of said upstream side of said pump and intermediate said deionizer means and said point of utilization.

3. A water purification system in accordance with claim 1 wherein means are provided for deenergizing said pump and for venting fluid within said reverse osmosis product water line to said drain upon predetermined low pressure conditions on said upstream side of said pump.

4. A water purification in accordance with claim 1 wherein means are provided for opening said reverse osmosis product water line to said drain and for closing communication between said water source and said upstream side of said pump upon deenergization of said pump.

5. A water purification system in accordance with claim 1 including an energization means operationally connected to said diverter valve means to actuate said diverter valve means for directing water to said deionizer bypass line as a function of the conductivity of water passing out of said deionizer means upstream of said point of utilization.

6. A water purification system comprising:
   a source of water;
   a pump having an upstream and a downstream side;
   an inlet line leading from said water source to said upstream side of said pump;
   a reverse osmosis means connected to said downstream side of said pump for providing purified product water and waste water;
   a deionizer means for providing deionized product water;
   a purified product water line leading from said reverse osmosis means to said deionizer means;
   a deionized product water line leading from said deionizer means to a point of utilization;
   a waste water line leading from said reverse osmosis means to a drain;

a fluid flow control means within said waste water line upstream of said drain;

a back pressure bypass line leading from said waste water line at a point prior to said fluid flow control menas to said upstream side of said pump;

a back pressure regulator within said back pressure bypass line for providing pressure relief from said waste water line when water pressure therein rises above a predetermined point;

a deionizer bypass line leading from said product water line upstream of said deionizer means to said point of utilization and around said deionizer means; and a diverter valve means positioned within said purified product water line upstream of said deionizer bypass line actuatable for selectively directing water from said purified product water line to said deionizer means or to said deionizer bypass line, and an energization means operationally connected to said diverter valve means to actuate said diverter valve means for directing water to said deionizer bypass line as a function of the conductivity of water passing out of said deionizer means upstream of said point of utilization.

* * * * *